Patented Mar. 16, 1937

2,074,309

UNITED STATES PATENT OFFICE 2,074,309

PROCESS FOR THE PREPARATION OF ANTHRAQUINONEDISULPHONIC ACIDS

Alexander J. Wuertz, Carrollville, Wis., assignor to E. I. du Pont de Nemours & Company, Wilmington, Del., a corporation of Delaware No Drawing. Application June 24, 1936, Serial No. 87,116

4 Claims. (Cl. 260—57)

This invention relates to the preparation of beta-anthraquinonedisulphonic acids and more particularly to an improved process for isolating substantially pure 2,6-anthraquinonedisulphonic acid from isomeric bodies and other products of the sulphonation reaction.

It is well known that when anthraquinone is sulphonated in sulphuric acid containing from 30 to 50% sulphur trioxide at 140–170° C. until complete sulphonation takes place, the main products formed are the 2,6- and 2,7-anthraquinonedisulphonic acids. Heretofore, it has been the practice to separate these isomeric disulphonic acids from the sulphonation mass in the form of their alkali metal salts, by drowning the sulphonation mass in water and salting. The isomers, however, are difficult to separate from each other in the pure state and the conversion of these alkali metal salts to the free sulphonic acid is commercially impractical.

It is an object of the present invention to provide a simple and economical process for the isolation of 2,6-anthraquinonedisulphonic acid as such in substantially pure form.

It is a further object of the invention to provide a method for isolating both the 2,6- and 2,7-disulphonic acids as such from the sulphonation mass and in a manner whereby they can be further separated from each other and employed as the free acids or converted to the alkali metal salts if desired.

I have found that the 2,6-anthraquinonedisulphonic acid with substantial quantities of the 2,7-isomer can be separated directly from the sulphonation mass in the form of the free sulphonic acid, by diluting the sulphonation mass to from 75–80% sulphuric acid concentration and filtering. The 2,6-isomer can then be separated quite completely from the 2,7 by suspending the filter cake in 20–30% hydrochloric acid and agitating until the 2,7-isomer has been taken into solution. On filtering, the residual cake is substantially pure 2,6-anthraquinonedisulphonic acid.

The following example is given to more fully illustrate the invention. The parts used are by weight.

Example 1

500 parts of pure anthraquinone (99.0–99.5% purity) are dissolved in 1500–2500 parts of 25–45% sulphuric anhydride at 70–100° C. The temperature is then raised to 140–145° C. and maintained at this point for one hour. It is then further raised to 160–170° C. and maintained within this range for two to four hours, or until a test sample shows no cloudiness when drowned in distilled water. The sulphonation mass, consisting mainly of 2,6- and 2,7-disulphonic acids, is then cooled to 100–120° C. and subsequently drowned in 1500–2500 parts of 60–65% sulphuric acid and then cooled to 20–25° C., allowing the disulphonic acids to crystallize. The impurities under these conditions remain in solution. The crystalline mass is then filtered off on an acid filter and washed two or three times with 75–80% sulphuric acid in order to remove the mother liquor.

The residual grayish-white cake consisting of 2,6- and 2,7-disulphonic acids is now suspended in 1000–1500 parts of 20–30% hydrochloric acid (weight based on the quantity of anthraquinone used) and agitated for about two to three hours and subsequently filtered on an asbestos filter cloth. The residual cake, consisting of the free and pure 2,6-disulphonic acid, is washed with small amounts of 20–30% hydrochloric acid in order to remove the mother liquor.

The combined acid filtrates containing the pure 2,7-disulphonic acid in solution are diluted to about 8–10% acidity and heated to boiling. To this solution sufficient sodium or potassium chloride or other alkali metal salt is added to make about a 10–15% solution. The alkali salt of the 2,7-disulphonic acid crystallizes out upon cooling in white long needles practically free of the 2,6-isomer. The crystalline mass is then filtered off and dried.

The above residual cake of 2,6-disulphonic acid, obtained by the hydrochloric acid extraction may be converted into its alkali salt by dissolving in water and salting.

I claim:

1. In the process for the preparation of anthraquinone-2,6-disulphonic acid, the steps which comprise diluting the sulphuric acid mass resulting from the beta-disulphonation of anthraquinone to an acid concentration of from 75 to 80%, and filtering off the precipitated disulphonic acid.

2. In the process for the preparation of anthraquinone-2,6-disulphonic acid, the steps which comprise diluting the sulphuric acid mass resulting from the beta-disulphonation of anthraquinone to an acid concentration of from 75 to 80%, extracting the precipitated disulphonic acids with 20–30% hydrochloric acid and filtering off the substantially pure 2,6-anthraquinonedisulphonic acid.

3. In the process for the isolation of 2,6-anthraquinonedisulphonic acid from a mixture of 2,6- and 2,7-anthraquinonedisulphonic acids, the step which comprises extracting the mixture with a 20 to 30% hydrochloric acid solution and isolating the insoluble 2,6-anthraquinonedisulphonic acid.

4. In the process for the isolation of 2,6-anthraquinonedisulphonic acid from a mixture of 2,6- and 2,7-anthraquinonedisulphonic acids, the steps which comprise extracting the mixture with a 20 to 30% hydrochloric acid solution, isolating the insoluble 2,6-anthraquinonedisulphonic acid and salting out the 2,7-anthraquinonedisulphonic acid from the remaining acid solution.

ALEXANDER J. WUERTZ.